L. D. ALLEN.
DEMOUNTABLE TIRE RIM.
APPLICATION FILED APR. 20, 1920.
1,377,173.  Patented May 10, 1921.
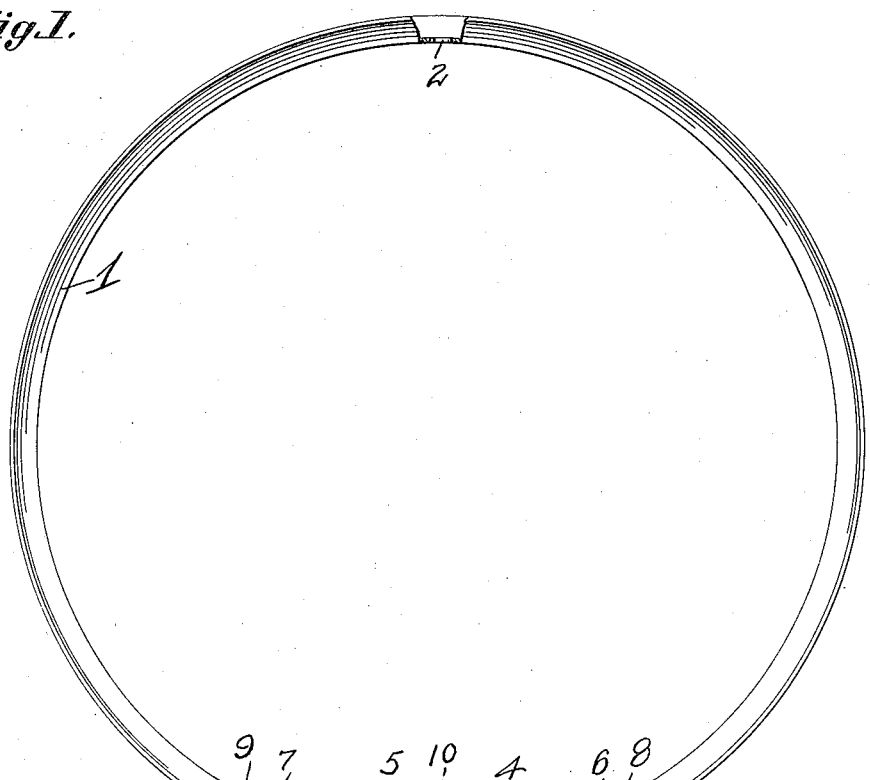
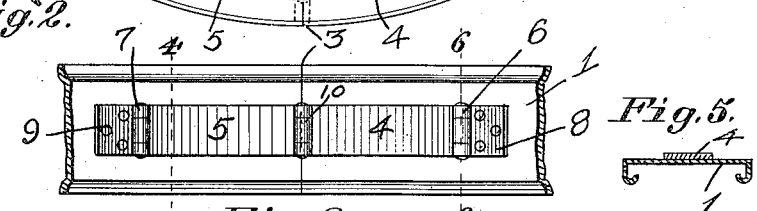
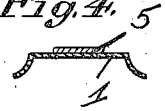
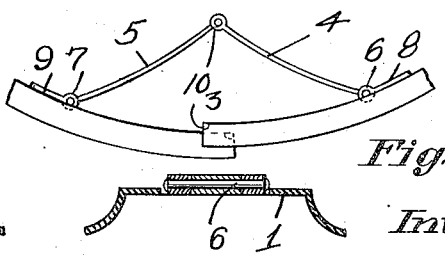
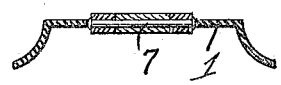
Inventors.
L. D. ALLEN
Witness.

UNITED STATES PATENT OFFICE.

LUEAN D. ALLEN, OF SAN FRANCISCO, CALIFORNIA, ASSIGNOR OF TWO-FIFTHS TO WILLIAM E. ALLEN, OF SAN FRANCISCO, CALIFORNIA.

DEMOUNTABLE-TIRE RIM.

1,377,173.  Specification of Letters Patent.  Patented May 10, 1921.

Application filed April 20, 1920. Serial No. 375,226.

*To all whom it may concern:*

Be it known that I, LUEAN D. ALLEN, a citizen of the United States, and a resident of San Francisco, county of San Francisco, and State of California, have invented a new and useful Demountable-Tire Rim, of which the following is a specification.

The present invention relates to tire rims and has for its object to provide a practical and convenient manner for removing and applying a pneumatic tire to the rim.

A further object of the invention is to so construct the rim that a tire may be removed from and applied thereto without the use of tools or an undue amount of effort.

With these and further objects in view the invention will be further described with reference to the accompanying drawing which forms a part of this specification.

In said drawing:

Figure 1 is a side elevation of a conventional demountable rim illustrating the application of the invention; Fig. 2 is a detail plan view showing the invention as applied; Fig. 3 is a detail side view showing manner of manipulating the invention;

Fig. 4 is a cross section on the line 4—4 Fig. 2;

Fig. 5 is a cross section of a slightly different form of rim;

Fig. 6 is a cross section on the line 6—6 Fig. 2, and

Fig. 7 is a cross section showing a slightly different position of the hinge or pivotal mounting for the manipulating arms.

Referring now to the drawings in detail: 1 represents the rim which may be made in any convenient manner having an opening 2 for the valve of the inner tube of the tire.

The rim is divided as at 3 to form a resilient structure with its ends normally assuming a confronting position as shown in Fig. 1. 4 and 5 represent a pair of manipulating arms which are pivotally or hingedly mounted as at 6 and 7 to the rim on opposite sides of the division 3 by means of hinge plates 8 and 9. The free ends of the arms are pivoted or hinged as at 10.

The arms are of a length of substantially that of the distance between the division 3 and the mountings 6 and 7 so that the hinged connection 10, when the arms are normally in place will assume a position adjacent the division.

In changing a tire a jolt is imposed on the rim at a point to one side of the division 3 whereby the confronting ends will be caused to overlap by the resiliency of the rim. This will, of course, shorten the circumference of the rim and permit an easy removal of the tire carried thereby. When the ends have been overlapped as shown in Fig. 3 the manipulating arms 4 and 5 will buckle at the connection 10 and assume a position as in Fig. 3.

When a tire has been replaced on the rim while the ends thereof are overlapped a downward thrust on the arms at the hinged connection 10 will cause the arms to return to normal position thus spreading the rim and returning the ends of the rim to confronting position where they will be locked with the tire maintained fixed on the rim.

It will now be seen a tire carried by the rim may be changed without the customary tools and an undue effort.

The pivotal or hinged mounting of the arms on the rim may be made as shown or arranged in any other convenient manner. When the hinges protrude on the felly engaging surface of the rim, the felly of the wheel on which the tire is used will be recessed to accommodate the hinges.

I claim:

In a one piece contractile tire rim having a single transverse split, the combination of a spreader hinged to the rim on opposite sides of said split, and comprising a pair of arms with their inner ends hinged together, the parallel edges of said split being notched to provide a seat for the hinge of the inner ends of the arms when the split ends of the rim are in normal confronting position, said spreader adapted to permit the contractile properties of the rim to lessen its diameter by overlapping the ends of the transverse split, and also adapted to impart a spreading thrust in opposite directions to said ends for returning the same to normal confronting position.

LUEAN D. ALLEN.